United States Patent Office 3,136,748

Patented June 9, 1964

3,136,748
SULFURIZED ESTERS

Richard Miller, Oldbridge, Harold K. Latourette, Hopewell Township, and Ernest J. Rich, Jr., Edison, N.J., assignors to FMC Corporation, a corporation of Delaware No Drawing. Filed June 22, 1960, Ser. No. 37,829
11 Claims. (Cl. 260—125)

This invention relates to novel sulfurized esters. More particularly, the invention relates to sulfurized diesters of alkenylsuccinic acids.

The treatment of diesters of alkenylsuccinic acids with sulfur has previously been described. Thus U.S. Patent No. 2,454,862 to George T. Collins describes the reaction of sulfur with diesters of alkenylsuccinic acids at temperatures in the range of 100° to 200° C. to produce sulfur-containing products. However, the products thus produced contain only very small amounts of chemically bound sulfur, even at the upper limits of sulfur suggested by the patent.

It is the object of this invention to provide sulfurized diesters of alkenylsuccinic acids containing relatively large quantities of stable, chemically bound sulfur. It is also an object of this invention to provide new and useful lubricating oil additives, having superior properties.

We have now found that sulfurized reaction products containing large quantities of chemically bound sulfur are obtained by reacting elemental sulfur with a diester of an alkenylsuccinic acid if the temperatures are maintained sufficiently high so as to produce substantial evolution of hydrogen sulfide during the course of the heating. We have found further that these highly sulfurized products are very effective lubricating oil additives, a utility which is not possessed by related products produced under the conditions described in the Collins patent.

The diesters of alkenylsuccinic acids which are sulfurized to the products of this invention have the general formula

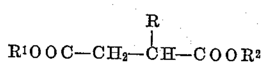

$$R^1OOC-CH_2-\underset{|}{\overset{R}{C}}H-COOR^2$$

where R is an alkenyl radical containing at least 3 carbon atoms; that is, any unsaturated aliphatic or alicyclic radical containing at least one olefinic double bond. $R^1$ and $R^2$ represent organic radicals, the nature of which is immaterial for purposes of the reaction described herein. Thus, $R^1$ and $R^2$ may each be an alkyl, alkoxyalkyl, cycloalkyl, aryl, aralkyl, alkaryl or heterocyclic radical, or substituted derivative of such radicals, where the diester is derived from a monohydric alcohol or phenol. $R^1$ and $R^2$ may also be derived from a dihydric alcohol, whereby the diester is either formed by intramolecular esterification, in which case $R^1$ and $R^2$ are a single divalent radical, or by intermolecular esterification resulting in a polyester. The precise nature of R, $R^1$ and $R^2$ is not critical, since the sulfurization reaction proceeds, under the conditions disclosed herein, in a manner independent of these radicals, provided R is an alkenyl radical containing at least 3 carbon atoms.

The diesters of alkenylsuccinic acids may be prepared by known methods, such as by reacting an alkenylsuccinic acid, acid anhydride or acid chloride with a monohydric or dihydric alcohol or phenol. The alkenylsuccinic acids and acid derivatives are readily prepared by reacting an olefin containing at least 3 carbon atoms with maleic anhydride or derivative. This reaction is typically carried out by heating the reactants at elevated temperatures. Examples of olefins which are suitable for this purpose are propylene and its polymers such as dipropylene, tripropylene and tetrapropylene; isobutylene and polymers thereof such as diisobutylene and triisobutylene; higher olefins such as 2-methyl-1-butene, 2-methyl-2-butene, 3,4-dimethyl-2-pentene, 2,2,3-trimethyl-1-butene, octene-1, 2-methyl-1-heptene, 2,4,4,-trimethyl-1-pentene, 2,4,4-trimethyl-2-pentene, nonene-1, 2-methyl-1-octene, 4-methyl-4-octene, 2,4-dimethyl-3-heptene, dodecene-1, 2-methyl-1-pentadecene, 2-methyl-3-hexyl-1-nonene, 3-methyl-4-hexyl-5-tridecene, and mixtures containing these olefins. Cyclic olefins such as cyclohexene, cyclohexene, cyclopentene, vinyl cyclohexene, limonene, alpha-pinene and dicyclopentadiene are also suitable for reaction with maleic anhydride.

The esterification of the alkenylsuccinic acid or acid derivative may be carried out under standard esterification conditions, such as reaction with an alcohol or alkyl halide, normally at elevated temperatures. The esterifying group may be derived from a monohydric alcohol or phenol, representative examples of which include methanol, ethanol, n-propanol, isopropanol, n-butanol, isobutanol, n-amyl alcohol, n-hexanol, 2-methyl-1-pentanol, 4-methyl-2-pentanol, 2-ethyl-1-hexanol, 3,5,5-trimethyl-1-hexanol, iso alcohols such as the oxo alcohols produced by reacting diisobutylene with carbon monoxide and hydrogen, isodecanol, stearyl alcohol, alkoxy alkanols such as 3-methoxybutanol and 2-butoxyethanol; cyclic alcohols such as furfuryl alcohol, cyclohexanol, 2-methylcyclohexanol, and 2,4,6-trimethyl-1-cyclohexanol; aralkanols such as benzyl alcohol and dimethylbenzyl alcohol; and aromatics incuding phenol, p-cresol and xylenol. It is preferable to use the higher molecular weight alcohols since the lower alkyl alcohols tend to be eliminated from the diester in a small degree during sulfurization. Polyhydroxy compounds such as ethylene glycol, propane-1,3-diol, butane-1,4-diol, pentane-1,5-diol, diethylene glycol and 2-ethylhexane-1,3-diol are typical polyols suitable for producing cyclic diesters or polyesters.

The alkenylsuccinate is sulfurized by reaction with elemental sulfur at a sulfur to diester mole ratio in the range from about 4:1 to 15:1; a mole of sulfur representing one unit atomic weight, and a mole of diester being a unit molecular weight. Molar ratios below about 4:1 result in products containing less than the preferred quantity of sulfur. For best results, a quantity of sulfur should be used which is in excess of the amount which is desired to be incorporated into the product. Such excesses have no detrimental effect upon the product, and any unreacted sulfur may be recovered and reused in the reaction, if desired. However, molar ratios in excess of about 15:1 are undesirable for economic reasons. Preferably, 5 to 8 moles of sulfur are present for each mole of diester to be sulfurized.

The sulfurization reaction requires a temperature high enough to produce substantial evolution of hydrogen sulfide, which generally starts at temperatures just above 200° C. As the molecular weight of the diester being sulfurized increases, particularly as the size of the alkenyl group increases, somewhat higher temperatures are required for initiation of the reaction. The reaction is preferably carried out at temperatures in excess of the initiation temperature, in order to provide a satisfactory rate of reaction. The maximum temperature is governed by the stability of the sulfurized product. Carbonization of the product may become appreciable, at temperatures in excess of about 260° C., if exposed to these temperatures for a long period of time. Temperatures as high as about 500° C. can be tolerated for brief periods. The preferred temperature is in the range of about 205° to 260° C.

The reaction is suitably carried out by mixing the sulfur and diester in an appropriate reaction vessel and heating to the reaction temperature. The mixture is preferably stirred or otherwise agitated during the reaction. The duration of the reaction depends upon the temperature and the extent of sulfurization desired. Generally the reaction is allowed to proceed until the quantity of hydrogen sulfide evolved indicates that the desired degree of sulfurization has been achieved.

The sulfurized product is believed to be a mixture of materials having varied sulfur contents. The major portion of the product mixture is an oil. Small amounts of insoluble materials, believed to be high in sulfur content, may also be formed during the reaction; these insoluble materials are readily removed by filtration.

The sulfurized alkenylsuccinates produced herein are excellent lubricating oil additives, with the particular advantages of increasing the wear properties and the load-carrying capacity of lubricating oils. By increasing the lubricity of lubricating oils, they decrease the wear on moving parts and increase the load which these parts can carry without being welded together. These sulfurized alkenylsuccinates are especially useful as additives for motor oils and gear-lubricants; that is, petroleum distillates boiling above 325° C. and having a viscosity greater than 50 seconds Saybolt Universal at 100° F. The addition of about 0.1% of the sulfurized diester results in significant improvement. No special advantages accrue from the presence of more than about 15% of the additive. Preferably, 1% to 10% of sulfurized diester is added to the lubricating oil.

The following examples illustrate the preparation and use of typical sulfurized alkenylsuccinates of this invention. All parts and percentages are by weight.

EXAMPLE I

*Sulfurized Bis(Trimethylpentyl) Methallylsuccinate*

Bis(2,2,4-trimethylpentyl) methallylsuccinate was prepared by reacting 2,2,4-trimethyl-1-pentanol with methallylsuccinic anhydride in the presence of a catalytic amount of sulfuric acid. The reaction was allowed to proceed for a period of 20 hours at a temperature in the range of 120° to 142° C. to give a yield of 95% of theoretical.

A mixture containing 356 parts of bis(2,2,4-trimethylpentyl) methallylsuccinate and 153 parts of elemental sulfur was charged to a flask. The mixture was agitated and heated to 205° C. at which temperature the evolution of hydrogen sulfide gas started. Heating was continued for 14 hours at 210° to 220° C., during which time 63.4 parts of hydrogen sulfide was evolved. The batch was cooled, diluted with about 1950 parts of hexane, and filtered. The filtrate contained 433 parts of a deep red oil having a neutralization number of 1.82. Analysis showed that the product contained 19.6% of chemically bound sulfur.

The alkenylsuccinates of the following examples were prepared following the procedure of Example I.

EXAMPLE II

*Sulfurized Bis (Dimethylpentyl) Methallylsuccinate*

A mixture of 305 parts of bis(2,4-dimethylpentyl) methallylsuccinate and 132 parts of sulfur was charged into a flask, stirred and slowly heated to 202° C., at which temperature hydrogen sulfide evolution began. Heating was continued at 210° to 220° C. for a period of 7 hours. The product was cooled, and filtered, to yield 297 parts of a red oil having a neutralization number of 1.15 and a chemically bound sulfur content of 22.8%. The product was diluted with benzene, slurried with activated carbon, filtered to remove insoluble materials and vacuum stripped to remove the benzene.

EXAMPLE III

*Sulfurized Dibutyl Methallylsuccinate*

A mixture of 104 parts of di-n-butyl methallylsuccinate and 58.6 parts of sulfur was charged to a flask and slowly heated to 205° C. at which point the evolution of hydrogen sulfide began. The heating was continued at 210° to 220° C. for 7 hours. After completion of the reaction the product was diluted with hexane and filtered to yield 78.4 parts of a deep red oil having a neutralization number of 0.6. Analysis showed that the product contained 24.3% chemically bound sulfur.

EXAMPLE IV

*Sulfurized Dipentyl Methallylsuccinate*

A mixture containing 252 parts of di-n-amyl methallylsuccinate and 130 parts of sulfur was charged to a flask and slowly heated to 202° C. at which temperature hydrogen sulfide was observed to be coming off. Heating was continued in the range of 210° to 215° C. for a period of 6 hours. The product was diluted with ether and filtered. The filtrate contained 227 parts of a red oil which had a neutralization number of 9.77. Analysis of the product indicated a chemically bound sulfur content of 22.8%.

EXAMPLE V

*Sulfurized Dihexyl Methallylsuccinate*

A mixture containing 290 parts of di-n-hexyl methallylsuccinate and 137 parts of sulfur was charged to a flask and slowly heated until the evolution of hydrogen sulfide began at 205° C. Heating was continued at 210° to 215° C. for a period of 4.5 hours. The product was diluted with either and filtered to give 285 parts of a deep red oil which were dissolved in 855 parts of active carbon. This mixture was stirred for 15 minutes at room temperature, filtered and vacuum stripped to remove the benzene. Analysis of the product indicated a chemically bound sulfur content of 20.0% and a neutralization number of 1.57.

EXAMPLE VI

*Sulfurized Diisobutyl Dodecenylsuccinate*

A mixture containing 198 parts of diisobutyl dodecenylsuccinate (prepared from tetrapropylene) and 80.2 parts of sulfur was charged to a flask and slowly heated to 220° C. at which temperature the evolution of hydrogen sulfide began. The heating was continued at 220° to 230° C. for 1.1 hours. After completion of the reaction the product was diluted with hexane and filtered to give 210 parts of a dark red-brown oil. This oil was diluted with benzene, slurried with activated carbon, filtered and stripped to remove benzene. Analysis of the product showed that it contained 11.3% chemically bound sulfur.

EXAMPLE VII

*Sulfurized Dihexyl Octenylsuccinate*

A mixture containing 198 parts of di-n-hexyl octenylsuccinate (derived from diisobutylene) and 80.2 parts of sulfur was charged to a flask and slowly heated until the evolution of hydrogen sulfide began at 230° C. Heating was continued at 230° C. to 240° C. for a period of 2.3 hours. The product was washed with hexane and filtered to give 234 parts of a dark bed-brown oil. After being diluted with benzene, slurried with activated carbon, filtered and stripped to remove the benzene, the product had a chemically bound sulfur content of 18.2%.

EXAMPLE IIX

*Sulfurized Dibutoxyethyl Octenylsuccinate*

A mixture containing 223 parts of di-2-butoxyethyl octenylsuccinate (derived from diisobutylene) and 80.2 parts of sulfur was charged to a flask, stirred and slowly heated to 230° C. at which point the evolution of hydrogen sulfide was first observed. Heating was continued in the range of 230° to 240° C. for a period of 1.8 hours. The product was washed with hexane and filtered to give 230 parts of a dark red-brown oil. The oil was diluted with benzene, slurried with activated carbon, filtered and stripped to remove the benzene. Analysis showed that the product contained 17.0% chemically bound sulfur.

EXAMPLE IX

*Sulfurized Dihexyl Octenylsuccinate*

A flask was charged with 198 parts of di-n-hexyl octenylsuccinate (derived from caprylene) and 80.2 parts of sulfur. The mixture was slowly heated to a temperature of 202° C. at which point hydrogen sulfide evolution began. Heating was continued for a period of 1.5 hours at a temperature in the range of 202° to 225° C. The product was diluted with hexane and filtered to give a filtrate containing 228 parts of a dark red-brown oil. The oil was stirred for 15 minutes at room temperature with 855 parts of benzene and 228 parts of activated carbon. The mixture was filtered and stripped to remove the benzene. The product contained 17.1% chemically bound sulfur.

EXAMPLE X

*Sulfurized Diisohexyl Nonenylsuccinate*

A mixture containing 200 parts of diisohexyl nonenylsuccinate (derived from tripropylene) and 78.1 parts of elemental sulfur were charged to a flask and slowly heated with agitation. When a temperature of 210° C. was reached, the evolution of hydrogen sulfide was first observed. The heating was continued for 1.8 hours at a temperature range of 210° to 225° C. After completion of the reaction the product was washed with hexane and filtered, to yield 224 parts of a deep red-brown oil. The oil was diluted with benzene, slurried with activated carbon, filtered and stripped, after which it was found to contain 11.7% chemically bound sulfur.

EXAMPLE XI

This example was carried out to measure the effect of the products of this invention on the wear prevention properties and the load carrying capacity (mean Hertz load) of lubricating oil. The wear test was carried out in a Precision Scientific Company four-ball wear tester in accordance with the standard method developed by the Naval Research Laboratory, in which higher mean specific pressures indicate increased wear prevention properties. Three 0.5 inch diameter steel bearng balls were cleaned and clamped into the ball pot of the apparatus. A naphthenic base petroleum distillate lubricating oil having a viscosity of 1120 seconds Saybolt Universal at 100° F. and containing no additives, was poured over the balls and a fourth ball was clamped into the chuck above the ball pot. With an applied load of 7 kilograms, the fourth ball was rotated against the three stationary balls at the rate of 1800 revolutions per minute for a period of 2 hours, while maintaining the temperature at 80° C. The diameter of the wear spots on the stationary balls was then measured, from which a mean specific pressure of 12,800 p.s.i. over the area of contact was calculated. The load carrying capacity of the base lubricating oil was measured with the same instrument in accordance with Federal Test Method Standard 791, Method 6503, in which higher mean Hertz load values indicate increased load carrying capacity. Welding of the balls occurred at an applied load of 89 kilograms and the mean Hertz load was found to be 9.8.

The wear prevention properties and load carrying capacity of mixtures containing 5% of various sulfurized alkenylsuccinic diesters and 95% of the base lubricating oil used above were determined in the same manner as set forth above. The results of these tests are summarized in the following table.

| Example | Sulfurized diester | Mean specific pressure, p.s.i. | Applied load at weld, kg. | Mean Hertz load |
|---|---|---|---|---|
| | None | 12,800 | 89 | 9.8 |
| 2 | Bis(dimethylpentyl) methallylsuccinate. | 19,300 | 251 | 38 |
| 5 | Dihexyl methallylsuccinate | 24,300 | 282 | 40 |
| 6 | Diisobutyl dodecenylsuccinate. | 42,300 | 178 | 27.9 |
| 7 | Dihexyl octenylsuccinate (from diisobutylene). | 32,500 | 224 | 34.1 |
| 8 | Dibutoxyethyl octenylsuccinate. | 24,300 | 224 | 32.3 |
| 9 | Dihexyl octenylsuccinate (from caprylene). | 45,900 | 200 | 31.3 |
| 10 | Diisohexyl nonenylsuccinate. | 45,900 | 200 | 27.5 |

It is seen that the sulfurized alkenylsuccinates of this invention substantially improve the wear prevention properties and load carrying capacity of lubricating oil.

Numerous other examples of sulfurized alkenylsuccinic diesters may occur to those skilled in the art without departing from the spirit of the invention or the scope of the following claims.

We claim:

1. The composition formed by reacting a diester of an alkenylsuccinic acid in which the alkenyl radical contains at least 3 carbon atoms with elemental sulfur at a temperature above 200° C. for a time sufficient to produce a substantial evolution of hydrogen sulfide.

2. The composition formed by reacting a diester of alkenylsuccinic acid in which the alkenyl radical contains at least 3 carbon atoms with elemental sulfur at a temperature above 200° C. and a sulfur to diester molar ratio of at least 4:1, for a sufficient time to produce a substantial evolution of hydrogen sulfide and a substantial chemical bonding of sulfur with the diester.

3. The composition of claim 2 in which the reaction is carried out at a temperature of 205° to 260° C. and a sulfur to diester molar ratio of 5:1 to 8:1.

4. The composition formed by reacting a dialkyl methallylsuccinate with elemental sulfur at a temperature above 200° C. for a time sufficient to produce a substantial evolution of hydrogen sulfide.

5. The composition formed by reacting a dialkyl methallylsuccinate with elemental sulfur at a temperature above 200° C. and a sulfur to succinate molar ratio of at least 4:1, for a sufficient time to produce a substantial evolution of hydrogen sulfide and a substantial chemical bonding of sulfur with the diester.

6. The composition formed by reacting a dialkyl methallylsuccinate with elemental sulfur at a temperature of 205° to 260° C. and a sulfur to succinate molar ratio of 5:1 to 8:1.

7. The composition formed by reacting bis(2,4-dimethylpentyl) methallylsuccinate with elemental sulfur at a temperature of 205° to 260° C. and a sulfur to succinate molar ratio of 5:1 to 8:1.

8. The composition formed by reacting di-n-hexyl methallylsuccinate with elemental sulfur at a temperature of 205° to 260° C. and a sulfur to succinate molar ratio of 5:1 to 8:1.

9. The composition formed by reacting diisohexyl nonenylsuccinate with elemental sulfur at a temperature of 205° to 260° C. and a sulfur to succinate molar ratio of 5:1 to 8:1.

10. The composition formed by reacting di-n-hexyl octenylsuccinate with elemental sulfur at a temperature of 205° to 260° C. and a sulfur to succinate mole ratio of 5:1 to 8:1.

11. The composition formed by reacting di-2-butoxyethyl octenylsuccinate with elemental sulfur at a temperature of 205° to 260° C. and a sulfur to succinate molar ratio of 5:1 to 8:1.

References Cited in the file of this patent

UNITED STATES PATENTS

| | | |
|---|---|---|
| 2,454,862 | Collins | Nov. 30, 1948 |
| 2,500,163 | Garwood | May 14, 1950 |
| 2,500,247 | Garwood | May 14, 1950 |
| 2,733,235 | Cross et al. | Jan. 21, 1956 |

UNITED STATES PATENT OFFICE

CERTIFICATE OF CORRECTION

Patent No. 3,136,748 June 9, 1964

Richard Miller et al.

It is hereby certified that error appears in the above numbered patent requiring correction and that the said Letters Patent should read as corrected below.

Column 2, lines 9 and 10, strike out "octene,"; lines 15 and 16, strike out "cyclohexene,"; column 4, line 40, for "either" read -- ether --; line 41, for "active" read -- activated --; line 72, for "bed-brown" read -- red-brown --; column 5, line 56, for "bearng" read -- bearing --; column 6, line 15, in the table, under the heading "Sulfurized diester" opposite 5, for "methallylsuccinate-" read -- methallylsuccinate --.

Signed and sealed this 10th day of November 1964.

(SEAL)
Attest:

ERNEST W. SWIDER
Attesting Officer

EDWARD J. BRENNER
Commissioner of Patents